(12) United States Patent  
Pourchet et al.

(10) Patent No.: US 8,499,686 B2
(45) Date of Patent: Aug. 6, 2013

(54) ROUND BALER (75) Inventors: Jeremy Pourchet, Gray (FR); Lionel Guiet, Gray (FR)

(73) Assignee: Deere & Company, Moline, IL (US)

( * ) Notice: Subject to any disclaimer, the term of this patent is extended or adjusted under 35 U.S.C. 154(b) by 57 days.

(21) Appl. No.: 13/118,874

(22) Filed: May 31, 2011

(65) Prior Publication Data

US 2012/0132090 A1 May 31, 2012

(30) Foreign Application Priority Data

Jun. 1, 2010 (EP) .................. 10164609.9

(51) Int. Cl.
*A01F 15/07* (2006.01)
*B30B 5/04* (2006.01)
(52) U.S. Cl.
USPC ........................................... 100/88

(58) Field of Classification Search
USPC .................. 100/87, 88, 89; 56/341
See application file for complete search history.

(56) References Cited

U.S. PATENT DOCUMENTS

| 4,334,467 | A | * | 6/1982 | Nishibe et al. | 100/89 |
| 5,224,328 | A | * | 7/1993 | Viaud | 56/341 |
| 6,640,699 | B2 | * | 11/2003 | Viaud | 100/7 |
| 7,340,996 | B1 | * | 3/2008 | Viaud | 100/88 |
| 7,568,425 | B2 | * | 8/2009 | Viaud | 100/87 |

FOREIGN PATENT DOCUMENTS

| DE | 4105078 | 8/1992 |
| EP | 1364574 | 11/2003 |
| EP | 1595438 | 11/2005 |
| WO | 2006040783 | 4/2006 |

* cited by examiner

*Primary Examiner* — Jimmy T Nguyen (57) ABSTRACT

A round baler is provided having a bale chamber that is partly covered by stationary side walls assuming the size and shape of the bale chamber and by a gate having a skirt which can be brought into an overlapping relationship with the side walls when the gate is closed.

17 Claims, 6 Drawing Sheets

ROUND BALER

FIELD OF THE INVENTION

This invention relates to a round baler having a bale chamber, the width of which is covered by a flexible belt and the sides of which are covered by walls, the belt being endless and routed about rolls.

BACKGROUND OF THE INVENTION

U.S. Pat. No. 4,334,467 A shows a round baler of the fixed chamber type with rotatable side walls of the size and shape of a round bale. These side walls are arranged inside of drums, which are journalled and rotate concentrically to the side walls. While the side walls almost slide along the inner side of the drum, endless bale forming elements with chains rest on the outer surface of the drum and move with it over about 270 degrees. The endless bale forming elements are routed over rolls in a gate and are lifted off the drum, as soon as the gate opens. A comparable design is shown in WO 2006/040783.

EP 1 364 574 A discloses a round baler, which can be of the variable or of the fixed chamber type, and which has side walls extending over the side surface of the bale chamber. A gate rotates about the center of the bale chamber and has rolls carrying endless bale forming elements, which move along the circumference of the side walls, when the gate opens. These side walls are moveable to and from the face sides of the bale chamber. When the gate closes, ramps on the gate move the walls inwardly, whereas the walls are moved outwardly by the pressure in the bale chamber, when the gate opens.

EP 1 595 438 A discloses a round baler having a belt-slat conveyor extending beyond side walls of a bale chamber and running over support wheels. Since the belts initially extend straight between the support wheels, but get deflected when sufficient crop enters the bale chamber, a gap appears between the belt run and the outer edge of the side wall, into which crop may enter and create blockages.

Document "KRONE RoundPack", printing reference Round Pack 1250/1550 (D) shows a round baler with a chain-bar conveyor, whereas at the end of the bars rolls are provided. These rolls are supported on a track behind the sidewalls of a bale chamber, whereas the bars move along the sidewall edge with a distance. Between the bars and the outer edge of the side wall a gap is provided.

From DE 4 105 078 A1 it is known, to cover the part of the bale chamber in the gate by an endless and closed bale forming element rolling along and on the circumference of the semi-circular side walls of the gate. In order to release the bale, the gate is opened with the sidewall and the endless bale forming element.

Furthermore it is ordinary practice in fixed chamber balers, to let the gate open slightly at the end of the baling process in order to achieve a higher density on the circumference as well as to achieve a bigger bale diameter. When the gate opens, a gap occurs between the gate and the frame, through which brittle crop may escape.

The problem this invention is based on is seen in the multiple gaps found in these balers, through which crop may escape or may plug, especially once the gate opens, even if it is for a few centimeters only.

SUMMARY OF THE INVENTION

According to the present invention no gap occurs between the gate and the frame, when the gate opens at the end of the bale forming process. No crop escapes and rolling resistance of the bale is also kept low, since the side walls remain as one closed smooth surface and unlike in the prior art, face sides of the bale need not scratch over edges at the frame and the gate. Depending on the overlap of the skirts and the side walls, bales of substantially different diameter can be achieved.

Having a single belt with a closed or at least substantially closed surface avoids having gaps across the width of the bale chamber in the gate area, which is more important than in the front of the bale chamber, since the crop escaping the gate will fall onto the ground and is lost, whereas the crop in the front will fall onto the pick-up and will be re-fed. Such a belt may be of rubber with fibers in it and profiled or smooth. No bars and rolls known from the prior art are exposed to the baling material and no gap exists between the belt and an adjacent edge of the side wall. Instead of bars and rolls the belt itself will move on the path and glide at least substantially along the edge of the walls. The round baler may be of a fixed chamber type, but also of a hybrid type, i.e. with a fixed chamber portion in the rear and a variable chamber portion in the front. The belt can be of rubber with reinforcement filaments, but also can have a sort of slats bolted onto a belt or chain carrier with a substantially closed surface gliding along a path. The belt in the preferred embodiment has a closed or substantially closed surface, with openings only big enough to alloy dust and small particles to escape. The belt is strong enough to carry a bale.

Installation and removal of the belt, especially if it has no disconnectible ends, is simplified, if at least some of the rolls can easily be taken away through slots, which do not require working inside the space surrounded by the belt to remove the rolls. The slots may be frame by flanges to fasten bearings of the rolls and may be covered by plates for safety and stability reasons.

Sheet type side walls are simple to produce, light and flexible enough to react on inner pressure in the bale chamber. Such sidewalls may yet have stiffeners and may also be of a single piece or of several pieces hinged to one another. The movement towards and away may be controlled by motors, mechanically or in any other way, like with slanted, guides at the gate, as is known.

Unlike known gates of a rigid and welded structure the gate of this round baler is much lighter and can thus be of lighter design, i.e. assembled by connecting the side structures via braces and the rolls via bolts. Raise load on the gate is lower, since it will have no contact with the side of the bale and will thus not have to lift a stuck bale for unloading. Such a light gate can be raised much faster, which reduces unloading time, and does not require very strong actuators.

The width of the side structures, i.e. the dimension along the bale rotation axis especially by adding the inward offset of the skirt, provides sufficient space for the retainer for a gate cylinder and/or a gate lock and/or a tensioning system for the rolls and/or idler wheels, which will provide for a narrow design of the round baler and avoid that these components will protrude at the side of the baler, which is disadvantageous for various reasons. Such design also avoids or at least reduces torsion forces in the side structure, when the lift cylinders extend.

Working in silage creates heavy bales, which may rest entirely on the lower rolls in the gate. In order to reduce stress in the side structure it is helpful to support the gate on the frame of the baler by means of a lock, retainer, holder or abutment and a counter lock, engaging each other. Such locks may be simple surfaces resting on each other as well as box like structures encompassing each other in several directions. Dampeners may be provided on the contact surfaces to reduce shocks. Even clamps or the like may be provided to assure a strong connection, leaving no room for relative movement.

Since the side walls are able to move away from the bale chamber but need to rest also against the inner surface of the side structures it is important to assure, that the side walls are moved towards the bale chamber, when the gate closes to avoid a crash. This can be achieved by a guide, like a wedge, a roll, a slanted bar or the like at the leading edge, of the gate, which will push the respective side wall inwardly.

In order to avoid a lateral belt movement, when external forces apply the belt, a roll is provided on both sides, which will stop any lateral belt movement without frictional engagement, as it would be the case with bars.

When one roll, over which the belt is routed, is able to push onto the circumference of the bale, the outer layer of the bale will become more compacted. The location of the roll needs to be such, that it protrudes into the bale chamber beyond the cylindrical run of the belt.

The side structures may consist of sheet metal of the same shape and only stiffeners, retainers, etc. are welded or bolted to either the left or the right side of the sheet metal.

A side sheet on the outer side of the side structure will be able to cover the space between the outer side of the side structure and the skirt, where the actuator, the roll to guide the belt, the tensioning mechanism and/or other components are located. This will result in a clean design and less possibilities for crop to accumulate outside the bale chamber and a safer environment for operators.

A lateral offset between the outside of the side structure and the skirt will provide for stability but also a path for the belt to slide on. The offset also creates space to receive the various components described above.

In order to further reduce the required drive force, between the downstream end of the path and a subsequent roll an idler decreasing the pressure of the belt on the path is provided. The idler is preferably rotatable, but could also be stationary with a hard and low friction surface. Such an idler could be a wheel, which if needed can be driven. At the downstream end of the path the pulling power is higher than at the upstream end and such an idler will avoid that the belt is pushed onto an edge at the exit of the path, but still follows substantially a circular path.

Driving a roll upstream of the path slightly faster than a roll downstream of the path will reduce friction in the path, since the belt and with it the bale will be slightly pushed. Such different speed may be adjustable due to the operational circumstances, but the differential speed will be in the low percentage region.

A hybrid type baler is created, if one part of the bale chamber is covered circumferentially by the belt, whereas another part is covered by baling elements being moveable to provide for a bale chamber of varying size. The moveable parts may be rolls, belts on moveable rolls, chain or belt and slat conveyors, etc.

Combining a gate bearing with a roll bearing allows swinging a gate hinged at the upper front area about the top front roll, which again allows driving the roll directly from the rolls in the front part of the round baler. If the gate bearing has a slot aligned with the slot in the side structure, the roll can be removed without disassembling the gate from the frame. The slot in the gate bearing may be closed by a bridge, i.e. a part closing the slot in the gate bearing releasably. The gate bearing is preferably a thrust bearing, but may also be a split ball, roll or needle bearing.

BRIEF DESCRIPTION OF THE DRAWINGS

The embodiments of the invention will be described in detail below with reference to the accompanying drawings wherein.

DESCRIPTION OF THE PREFERRED EMBODIMENT

Figure 1:
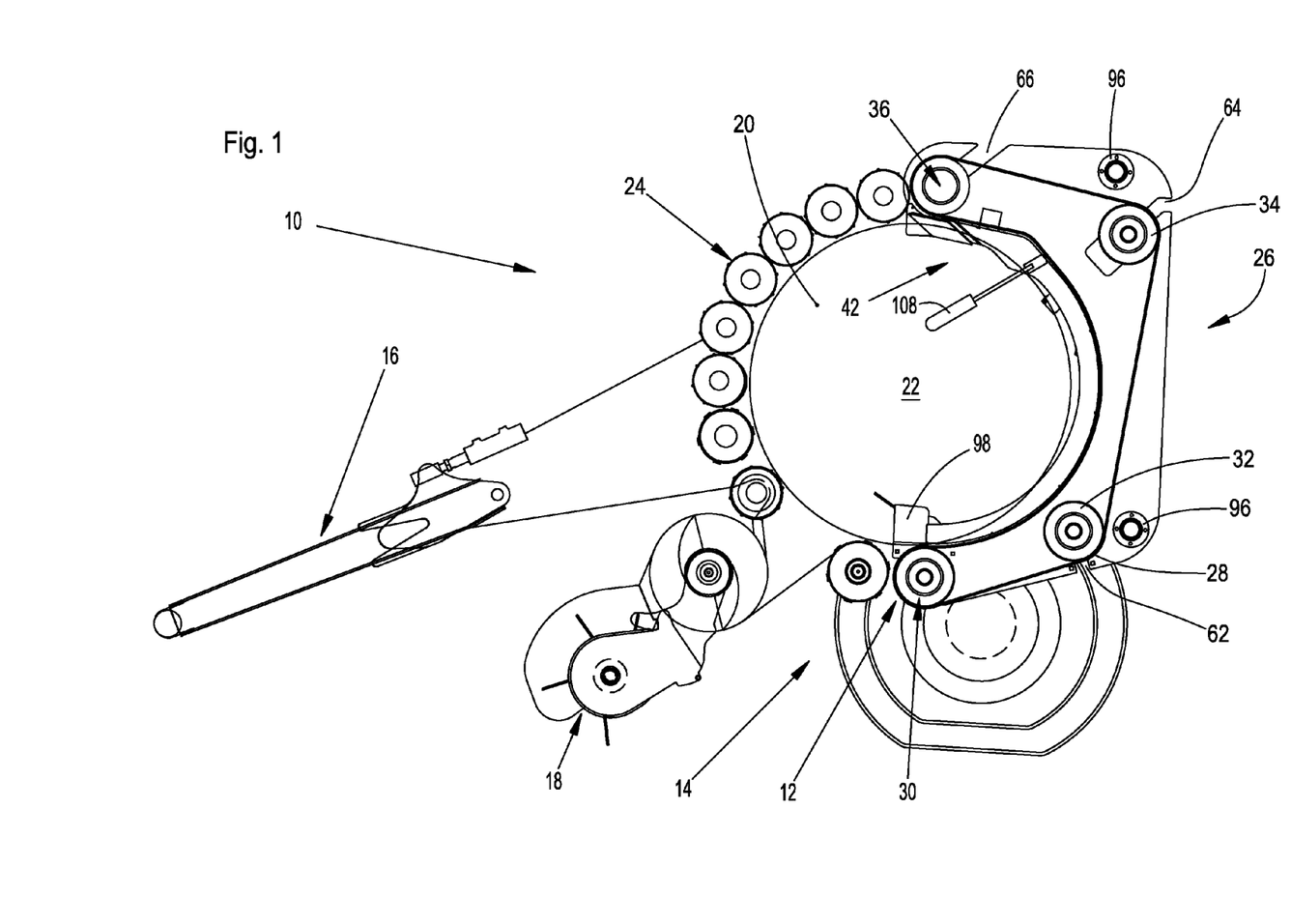
FIG. 1 is a side view of a round baler.

FIG. 1 shows a round baler 10 having a frame 12, a chassis 14, a tongue 16, a feeder 18 and a bale chamber 20.

The round baler 10 as shown is of the fixed chamber type, i.e. the bale chamber 20 is of fixed size in the front and of fixed or substantially fixed size in the rear; it could be also of a variable chamber type in the front. While the round baler 10 is mobile, it could also be stationary for use in industry. Normally it is moved over a field to bale harvested crop like straw, hay, grass, cotton or the like, whereas in industry it may bale paper, garbage, etc.

Figure 4:
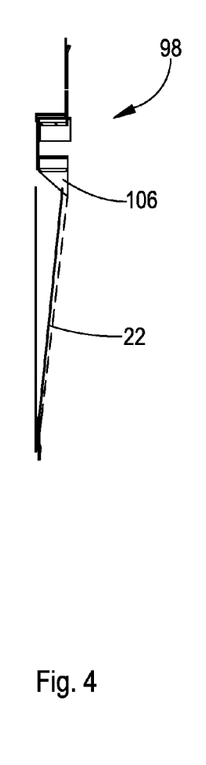
FIG. 4 a sectional view along the line 4-4 of FIG. 3.

The frame 12 is of a welded and bolted structure, which is not shown in detail here, but is well known in the art, like from JOHN DEERE round balers, and is supported on the chassis 14. Part of the frame 12 are side walls 22, extending vertically and distant from each other in a horizontal direction. These side walls 22 may be of one part along the length of the bale chamber 20 or of two parts, being split and hinged to each other substantially vertically—both types being well known in the art. The side walls 22 are big enough to cover the bale chamber 20 laterally. The outer and free periphery of the side walls 22 (see FIG. 4) follow substantially a circle, which does not exceed the diameter of a complete bale; it might also be smaller than the diameter of the bale. As can also be seen in FIG. 4, the front part of the side walls 22 is hinged, whereas the rear part is free. This free movement away from the bale reduces the friction on the bale, once a gate 26 is raised, yet it seals the bale chamber 20 laterally to the extent possible.

The chassis 14 comprises an axle, wheels, suspension and the like, as are necessary to support the frame 12 moveably on the ground.

The tongue 16 connects the round baler 10 to a pulling vehicle and is fixed to the frame 12 or the chassis 14.

The feeder 18 may comprise a pick-up and/or a cutting rotor and/or a cross auger. The latter are not necessary for a round baler, but are often used. The feeder 18 is carried by the frame 12, is variable in height to adjust to the ground contour and feeds material normally lying on the ground rearward into the bale chamber 20.

The bale chamber 20 is surrounded by bale forming elements 24 in the front and the gate 26 in the rear.

The bale forming elements 24 in the front are formed as a series of stationary rolls arranged substantially on a semi-circle as is widely known. These rolls are driven in a conventional manner and thus not described in further detail.

Figure 2:
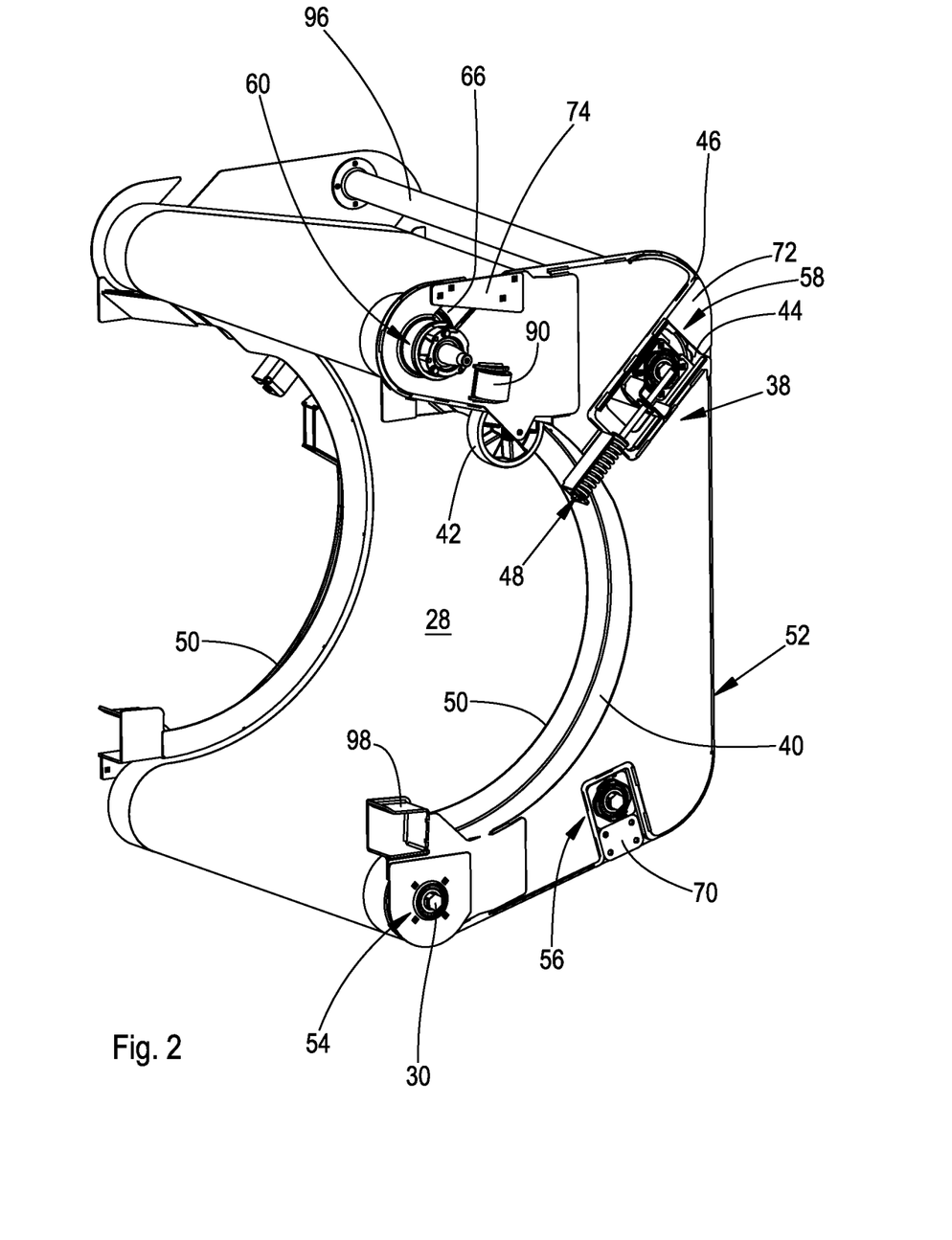
FIG. 2 is a perspective view of a gate of the round baler of FIG. 1 with a wide belt carried on a path on both sides and with a gate lock.

The gate 26 in the rear mainly contains a single endless, closed surface and flexible belt 28, i.e. spanning the entire bale chamber 20 and being of a material, known from current round balers on the market. Such a belt 28 has several layers of fibers in the lengthwise and crosswise direction and is covered on both sides with rubber or the like having a smooth or profiled surface. The belt 28 is made endless by connecting existing ends or by producing it as a single piece. Furthermore and as will become apparent from the further description the belt 28 has a different function in its center area as compared to its lateral end areas, since in the inner or center area it is in contact with the material to be baled and to be moved by the belt 28, whereas in the lateral end areas the belt 28 has to glide in or on a path 40. Accordingly it may be of different types in its regions, such as a kind creating more friction in the center area compared to the outer areas. Internal crosswise extending fibers (not shown) will be of such strength, that they hinder the belt 28 from collapsing into the bale chamber 20 in its upper section. A similar effect may be achieved by fibers being arranged in different layers with respect to the press material contact surface of the belt 28, which fibers are connected to each other to provide additional stiffness, like a flat bar extending radially with respect to the centerline of a bale in the bale chamber 20. Other fibers will in the lengthwise direction of the belt 28. The gate 26 is raised by a gate cylinder 108 as is well known. As an alternative to the belt 28, rolls, chains with slats, small belts etc. may be used.

The belt 28 is routed over a lower front roll 30, a lower rear roll 32, an upper rear roll 34 and an upper front roll 36. The lower front and rear rolls 30 and 32 are journaled freely in the side structures 52 and act as idler rolls, although either of the rolls 30, 32 could be driven to assist in moving the belt 28 with the bale. The upper rear roll 34 is journaled moveably against the force of a tensioning mechanism 38, but is also idling only. The upper front roll 36 is driven and rubber covered to create enough friction to move the belt 28. All, some or one of the rolls 30-36 may have a barrel shape, which assists in keeping the belt 28 centered. Furthermore the path 40 is provided in the form of a sheet, metal, bar, rail or the like connected to the side structures 52. The path 40 follows the shape of the bale chamber 20 for the completed bale, i.e. fully or partly circular. The part creating the path 40 is connected to the side structure 52 by means of angles, blocks or the like by bolting, welding or similar means. The belt 28 overlaps the path 40 and can thus glide on it without a gap. The surface of the path 40 is provided or covered by low friction material, like Teflon. The belt 28 is moving inside the bale chamber 20 upwardly and outside of it downwardly. It could also be of the opposite way, whereas the function of the rolls 30 and 36 needs to be adjusted. All rolls are oriented in parallel to each other.

Also provided is an idler 42 between the downstream end of the path 40 and the upper front roll 36 to guide the inner run of the belt 28. The idler 42 is located such, that it deflects the belt 28 away from the edge of path 40 to reduce the friction of the belt 28 onto the end edge of the path 40.

The tensioning mechanism 38 has a plate 44 on each side, each slideably received in a cavity 46 in the side structure 52. The plates 44 carry the roll 34 and are applied by a spring assembly 48. The spring assembly 48 has a spring and a bar bearing against the plate 44, which results in a movement of the plate 44 in the cavity 46 such, that the belt 28 is tensioned.

Attached at a small distance from the outer surface of the side structure 52 and abutting the path 40 is an inner strip-like wall or skirt 50, which like the side walls 22 actually delimits the bale chamber 20 laterally. The skirt 50 is fastened to either the side structure 52 or to the path 40 by appropriate means, like bolts, welding, etc. The radially outer edge of these skirts 50 follows the circular contour of the bale chamber 20 and provides a shoulder on which the belt 28 will rest and glide. The radially inner edge of the skirt 50 follows a circle concentric to the bale chamber 20 or bale, whereas the radial extension may be up to 10 or 15 cm or more or less. This, radial extension provides for an overlap between the side walls 22 and the skirts 50, when the gate 26 is closed. This overlap will assist in sealing the bale chamber 20 against crop to be baled exiting the bale chamber 20. The skirt 50 extends parallel to the side walls 22 and supports the latter against an outward movement due to the pressure inside the bale chamber 20.

Figure 5A:
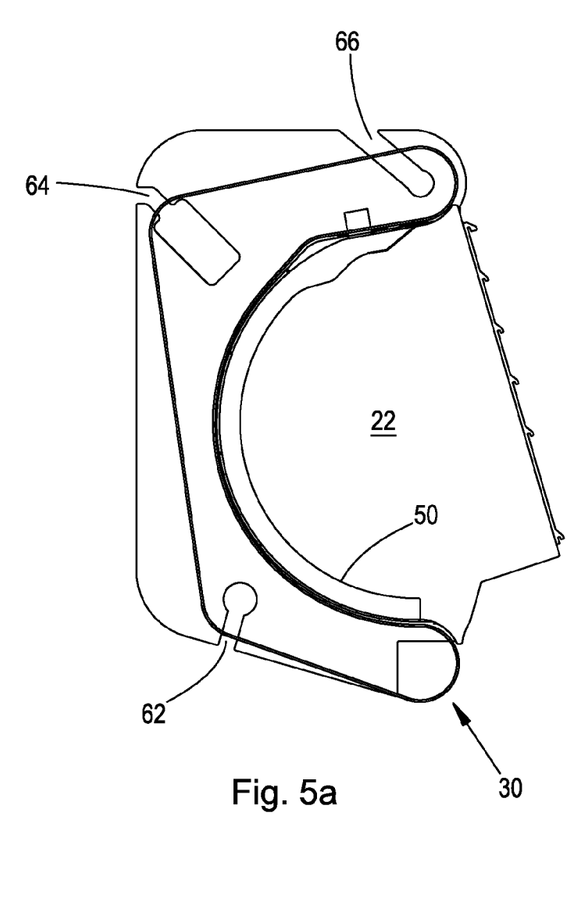
FIG. 5a depicts a condition wherein the gate is closed.
Figure 5B:
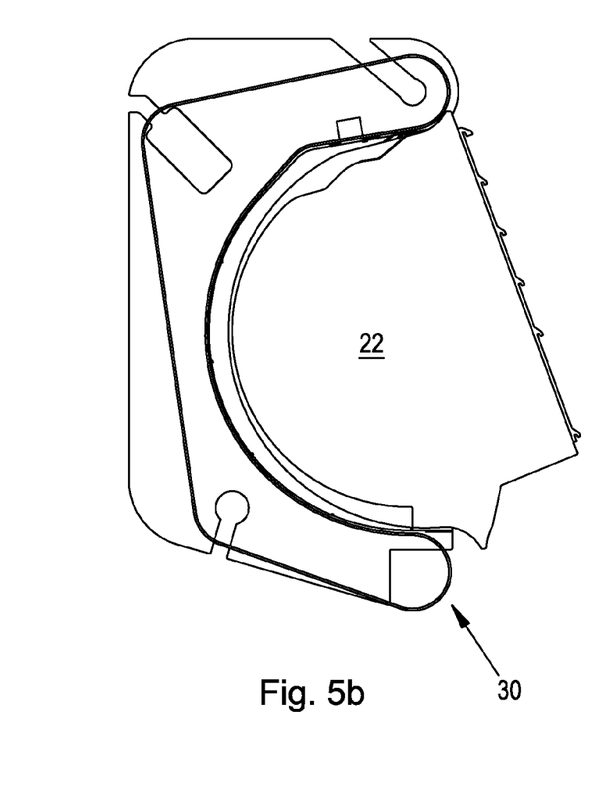
FIG. 5b depicts a condition wherein the gate is slightly opened.

Reference is made now to FIG. 5a, which shows the gate 26 in a closed position. In, this situation the side walls 22 are located concentrically in the section of the bale chamber 20 in the gate 26 and the lower roll 30 is very close to the lower rear edge of the side wall 22. In FIG. 5b due to the pressure in the bale chamber 20 the gate 26 is raised slightly and the lower roll 30 is moved away from side wall 22. In this situation the side walls 22 are no longer concentric in the gate 26, but there is still an overlap between the skirts 50 and the side walls 22 sealing the bale chamber 20. Depending on the chosen overlap, bales of different diameter may be produced.

The tensioning mechanism 38 may be provided in the space between the skirt 50 and the outer surface of the side structures 52. The Idler 42 is also arranged between the skirt 50 and the outer surface, whereas the idlers 42 extend beyond the outer surface of the path 40 to touch the belt 28 tangentially.

The side structures 52 are formed of strong welded sheet metals and are substantially a mirror image of one another. Both side structures assume, substantially the shape of an U, when seen from the side, and extend with their longitudinal plane vertically. The side structures 52 form the side of the gate 26. As can be seen mainly in FIG. 3, the side structures 52 have in the corner zones a lower front bearing area 54, a lower rear bearing area 56, an upper rear bearing area 58 and an upper front bearing area 60.

Figure 3:
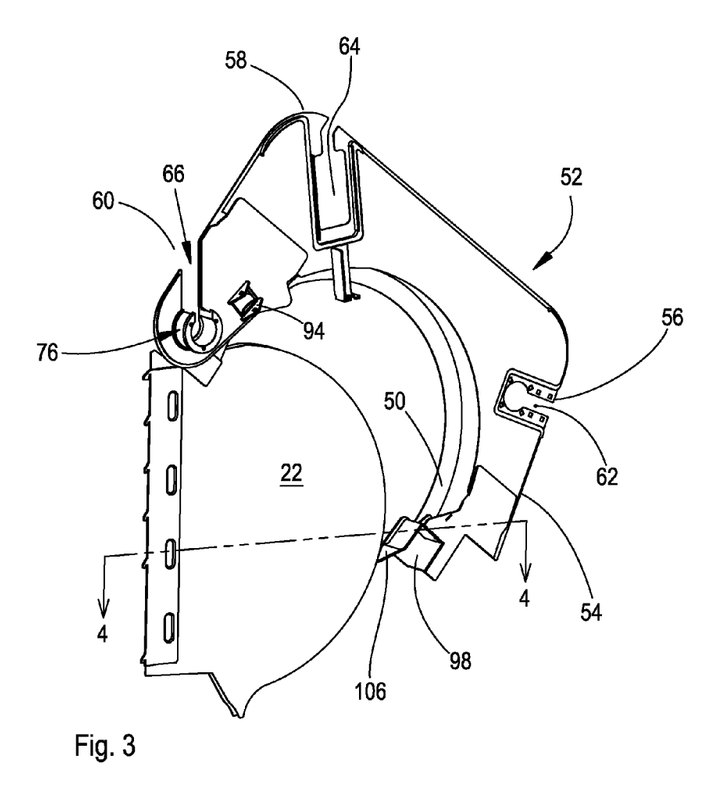
FIG. 3 is a perspective view of a right hand part of the gate of FIG. 2 in a raised position and in contact with a side wall of a bale chamber.

The lower front bearing area 54 is substantially a square cutout with a flange to receive a bearing (not shown) of the lower front roll 30, as is widely known.

The lower rear bearing area 56 has a slot 62, which extends lengthwise substantially perpendicular to the lower edge of the side structure 52 and also has a flange to receive a bearing for the lower rear roll 32. The slot 62 opens to the periphery of the side structure 52.

The upper rear bearing area 58 also has a slot 64, which extends lengthwise substantially under an angle of 45 degrees with respect to the adjacent peripheral line of the side structure 52, when it is closed. This slot 64 extends through and in the same direction as the cavity 46 and opens to the periphery of the side structure 52. The bearing of the upper rear roll 34 is not fixed to a flange in this bearing area 58 but to the plate 44 moving along this slot 64 under the control of the tensioning mechanism 38.

The upper front bearing area 60 again has a slot 66, which extends parallel to the slot 64 and has about the same length. The slot 66 receives a bearing assembly 68, which is described in more detail with respect to FIG. 7. Flanges, i.e. areas with holes to, receive bolts, are provided in the side structures 52 sidewards of the slots 62, 64, 66.

The slot 62 can be closed by a plate 70, the slot 64 by a plate 72 and the slot 66 by a plate 74 in order to provide for more stability and to avoid sharp edges, whereas these plates 70, 72, 74 are connected to the respective flanges, The bearing assembly 68 comprises a gate bearing 76 of the thrust bearing type and a roll bearing 78 of the roller bearing type.

Figure 7:
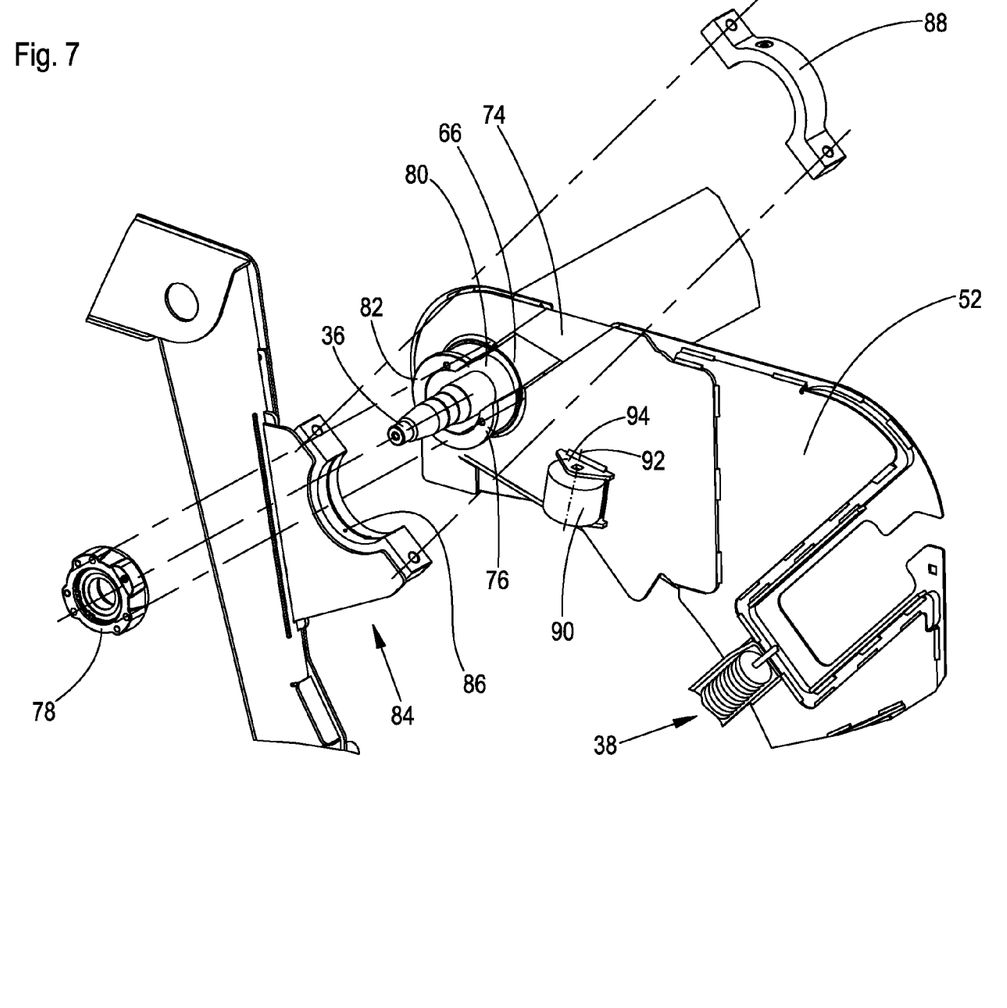
FIG. 7 is an exploded view of the gate bearing.

The gate bearing 76 is welded or otherwise rigidly fixed to the upper front bearing area 60, extends through the slot 66 and outwardly of the side structure 52. In this case the gate 26 pivots about an axis in its upper front area, rather than about an axis substantially at the center of the bale. The gate bearing 76 also has a slot 80, which is aligned to the slot 66 in dimension and direction. A flange 82 is provided on a surface of the gate bearing 76 facing outwardly, in order to receive the roll bearing 78. The gate bearing 76 is journalled in a bearing housing 84. The bearing housing 84 comprises a bearing support 86 fixed to the frame 12 in its upper rear area and a bridge 88, both covering a bearing cavity by 180 degrees each. The bridge 88 is bolted onto the bearing support 86 such that the bearing cavity is open in the same direction as the extension of the slot 66, when the bridge 88 is dismounted. As can be seen in FIG. 7, once the plate 74, the bridge 88 and the roll bearing 78 are dismounted, the roll 36 can be removed radially through the slots 66 and 80.

Between the bearing assembly 68 and the idler 42 a roll 90 is provided. The roll 90 rotates about an axis 92 formed on a holder 94 at the outer surface of the side structure 52. The side structure 52 leaves an opening at the holder 94, such that the roll 90 may protrude through the side structure 52 until the path 40, i.e. the plane, where the belt 28 moves. The axis 92 is oriented perpendicular to the path 40 and the belt 28 may touch the roll 90 with its side edge during its movement in order to provide for guidance.

Between the side structures 52 at least one brace 96 is provided, which extends parallel to either of the rolls 30 to 36 and provides stability to the entire gate 26. The brace 96 may be bolted or welded to the side structures 52.

Figure 6:
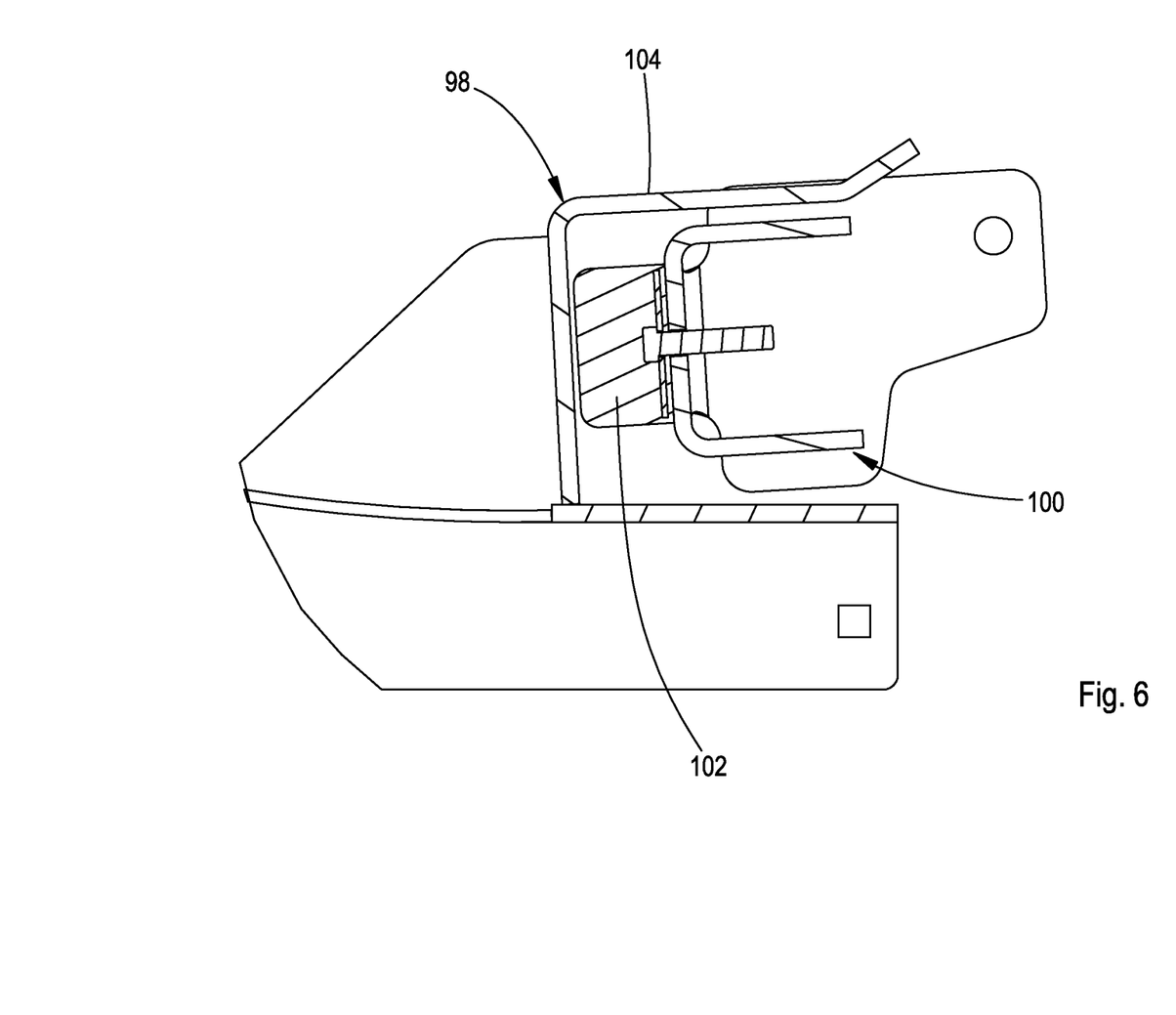
FIG. 6 is an enlarged view of a gate lock and a counter lock.

Above the lower front bearing area 54 a gate lock 98 is provided, which has the shape of a cube being open at two adjacent sides, whereas the open sides are at the front and the outside. The gate lock 98 is of sheet metal or cast and rigidly connected to the side structure 52. A counter lock 100 (see FIG. 6) is provided at the frame 12 such, that it may be received in the gate lock 98, when the gate 26 is closed. Between the vertical surfaces of the gate lock 98 and the counter lock 100 facing each other is provided (bolted, glued, etc.) a rubber block 102 to dampen shocks during the movement of the gate 26. A front edge of an upper wall 104 of the gate lock 98 is bent upwardly to assure a smooth mating movement, even, if the side structures 52 would have lowered somewhat. Attached to the upper wall 104 is a horizontal wedge shaped guide 106 (when the gate 26 is closed), whereas a tip of the guide 106 extends outside the side walls 22 and a slanted surface of the guide 106 starting at the tip is oriented such, that the side wall 22 leaning outwards is pushed inwards, when the gate 26 closes, such that it may slide along the inner surface of the skirt 50.

The roll 30 is located such, that it is either in front of or at least below the center of gravity of a bale formed in the bale chamber 20. As a consequence, the bale will rest on the roll 30, when the gate 26 is opened, and due to the gate movement will be moved out of the bale chamber 20. The gate lock 98 and counter lock 100 assist in carrying the weight of the bale.

The roll 32 and tensioning mechanism 38 are aligned to each other such that the tension in the belt 28 is not strong enough to carry the entire bale weight; partially the bale will be supported by the roll 32, which pushes onto the outer surface of the bale, each time the bale rests on the roll 32, which increases its compaction in the circumferential surface.

It is apparent from the above description, that the round baler 10 and the gate 26 are of a mirror image design, with the side structures 52, the side walls 22, etc. on both sides.

Having described the preferred embodiment, it will become apparent that various modifications can be made without departing from the scope of the invention as defined in the accompanying claims.

The invention claimed is:

1. A round baler having a bale chamber covered by at least partially laterally moveable side walls and a bale exit gate, when the gate is opened the side walls are disconnected from the gate, wherein the gate has side structures with a skirt, which follows a part of the circumference of the side walls and which is brought into an overlapping relationship with the side walls when the gate is closed.

2. A round baler according to claim 1, wherein the gate comprises a belt with one of a closed and substantially closed surface, which extends over the full width of the bale chamber.

3. A round baler according to claim 2, wherein the belt is routed over rolls, the rolls having a bearing area and wherein at least one bearing area of the rolls is provided with a slot which extends in the side structure radially outwardly.

4. A round baler according to claim 1, wherein at least one of the side walls is of a sheet type, is connected to a frame of the round baler and is moveable towards and away from the sides of the bale chamber.

5. A round baler according to claim 3, wherein a set of side structures are interconnected releasably by way of at least one of braces and the rolls.

6. A round baler according to claim 3, wherein the side structures have a width such that at least one of a retainer for a gate cylinder, a gate lock, a tensioning mechanism for the rolls and an idler can be assumed within the width.

7. A round baler according to claim 1, wherein a gate lock is provided on a freely moveable part of the gate and is formed to receive a counter lock on a frame of the round baler for a solid connection.

8. A round baler according to claim 1, wherein a guide is provided at a portion of the side structure which approaches the side walls of the bale chamber first when the gate moves to a closed position.

9. A round baler according to claim 2, wherein the side structures comprise a roll being located such that it acts on the lateral edge of the belt.

10. A round baler according to claim 3, wherein one of the rolls routing the belt is located such that the belt is deflected to the interior of the bale chamber.

11. A round baler according to claim 1, wherein the side structures are composed at least substantially of identical parts.

12. A round baler according to claim 1, wherein a side sheet is provided on the outer side of the side structure.

13. A round baler according to claim 2, wherein a shoulder type path is fastened to the side structure at one end and to the skirt at the other end to provide for an offset of the skirt to the inner surface of the side structure towards the interior of the bale chamber.

14. A round baler according to claim 13, wherein between the downstream end of the path and a subsequent roll a rotatable idler is provided for decreasing the pressure of the belt on the path.

15. A round baler according to claim 13, wherein a roll upstream of the path is driven faster than a roll downstream of the path.

16. A round baler according to claim 2, wherein one part of the bale chamber is covered circumferentially by the belt, whereas another part is covered by bale forming elements being moveable to provide for a bale chamber of varying size.

17. A round baler according to claim 1, wherein the gate in at least one roll bearing area serves also as gate bearing and has a radially extending slot.

* * * * *